Figure 1B:
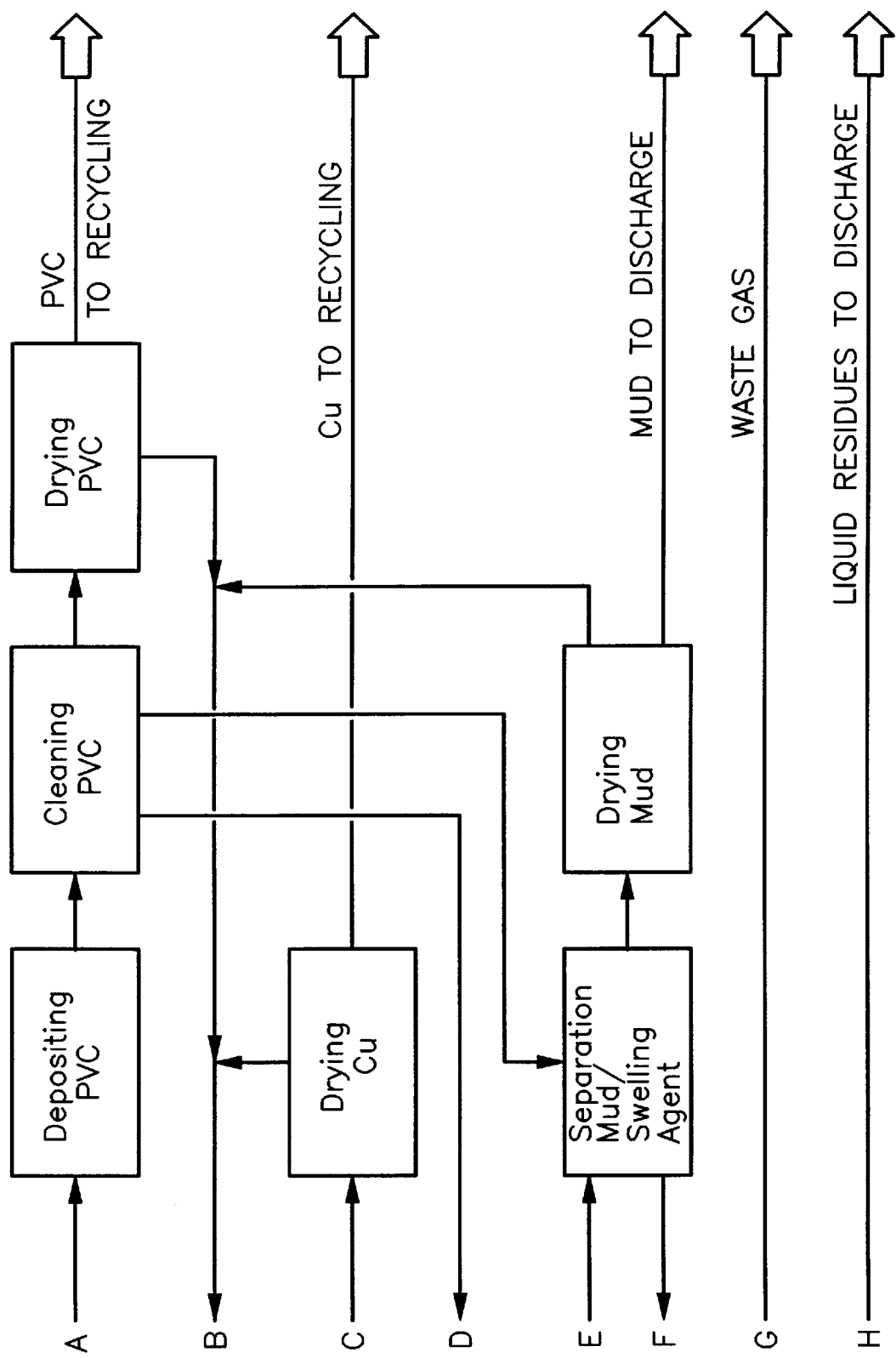

United States Patent
Drzevitzky et al.

[11] Patent Number: 6,123,277
[45] Date of Patent: Sep. 26, 2000

[54] PROCESS AND DEVICE FOR MAKING USE OF PLASTIC-COATED OR SHEATHED WIRING AND WASTE WIRE FOR THE SEPARATE RECOVERY OF METAL AND PURE RECYCLABLE PLASTIC

[76] Inventors: Bernd Drzevitzky, Lameystrasse 24, 68165 Mannheim; Hans Jürgen Walke, Rosenweg 20, 61381 Friedrichsdorf; Hartmut Leitzke, Stettiner Strasse 16, 69502 Hemsbach, all of Germany

[21] Appl. No.: 08/702,531
[22] PCT Filed: Feb. 8, 1995
[86] PCT No.: PCT/DE95/00158
  § 371 Date: Oct. 15, 1996
  § 102(e) Date: Oct. 15, 1996
[87] PCT Pub. No.: WO95/21732
  PCT Pub. Date: Aug. 17, 1995

[30] Foreign Application Priority Data

Feb. 8, 1994 [DE] Germany ............... 44 03 856
Nov. 19, 1994 [DE] Germany ............... 44 41 229

[51] Int. Cl.[7] ............................. B02C 19/12
[52] U.S. Cl. .................. 241/20; 241/21; 241/23; 241/24.13; 241/24.18; 241/29; 241/79.1; 241/152.2; 241/DIG. 14
[58] Field of Search .............. 241/20, 21, 24.13, 241/24.14, 24.15, 24.18, DIG. 14, 152.2, 101.8, 79.1, 23, 29

[56] References Cited

FOREIGN PATENT DOCUMENTS

| | | |
|---|---|---|
| 0156144 | 10/1985 | European Pat. Off. . |
| 1963148 | 7/1970 | Germany . |
| 2328448 | 2/1975 | Germany . |
| 3340273 | 5/1985 | Germany . |
| 3512965 | 10/1986 | Germany . |
| 4119303 | 12/1991 | Germany . |
| 8302811 | 7/1983 | WIPO . |
| 9412565 | 6/1994 | WIPO . |

*Primary Examiner*—Mark Rosenbaum
*Attorney, Agent, or Firm*—Horst M. Kasper

[57] ABSTRACT

The invention relates to a method for the recycling of plastic-coated cable residues, which comprise a metal core and a plastic jacket, wherein the metal parts are separated from the jacket and are separately recovered. The cable residues are communited and the chopped material is softened in a swelling container (10) with a swelling agent for the plastic. Subsequent to softening, the mass flow is fed with the swelling agent to a roller cone mill (13). The roller cone mill (13) flexes the chopped material and destroys the macrostructure of the cable pieces mechanically. The metal particles are separated from the jackets by way of stirring in a stirrer (14), and the multi-phase mixture is transported to a metal sedimentor (16). The heavier metal particles sink down in the metal sedimentor (16) based on gravity and separate themselves from the lighter plastic particles. The transport speed of the transport flow in the metal sedimentor (16) is selected such that the metal particles corresponding to their size-dependent different sinking speeds sink up to the outlet out of the metal sedimentor (16). A countercurrent of swelling agent is entered into the transport flow, where the countercurrent discharges the lighter plastic particles from the transport flow. Thereupon, the countercurrent with the plastic particles is led out of the metal sedimentor (12) as a partial flow and is led into a plastic sedimentor (38) for the sedimented depositing of the plastic particles. The method is performed sealed against gas and the swelling agent is cyclically recovered.

56 Claims, 10 Drawing Sheets

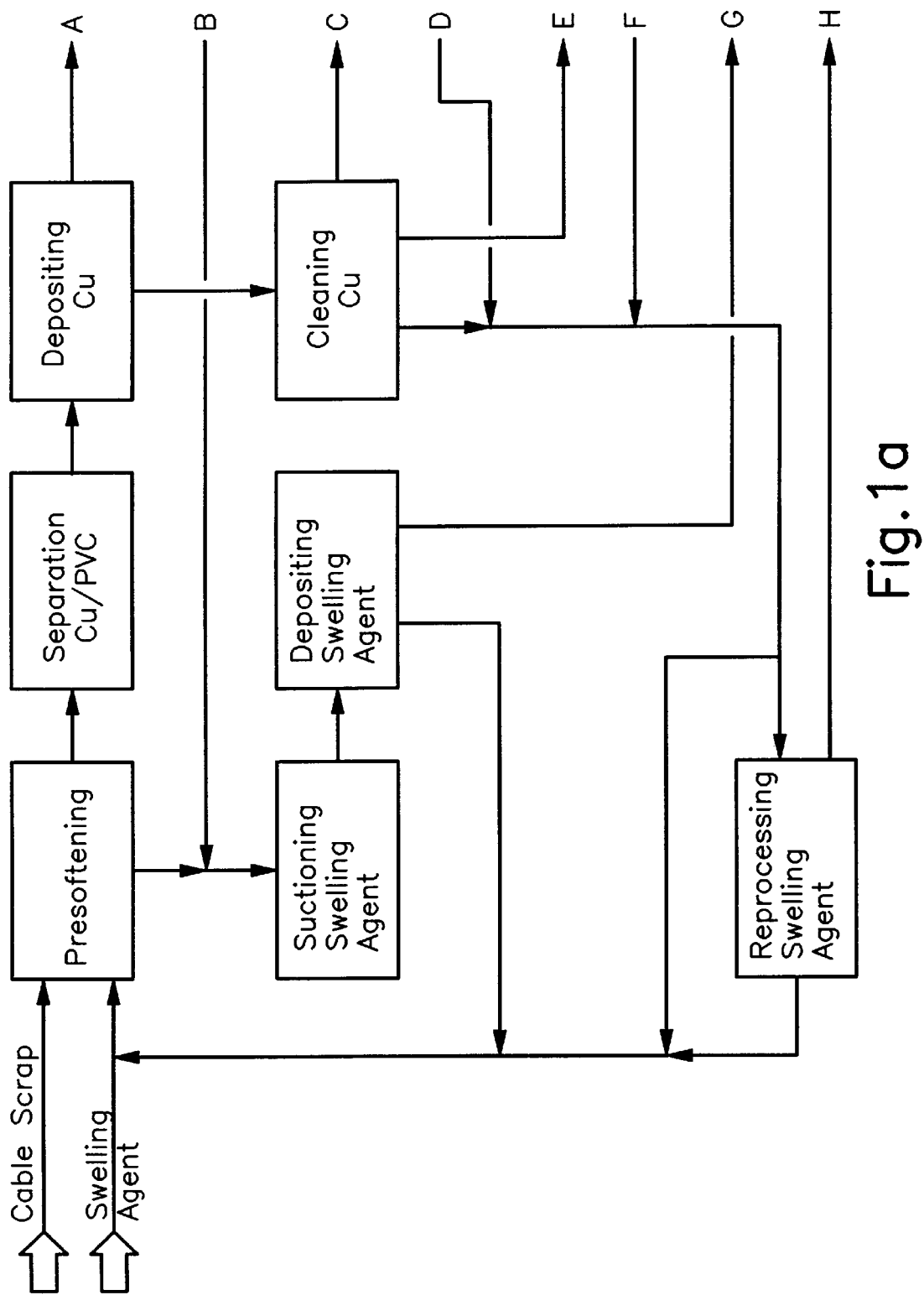

PROCESS AND DEVICE FOR MAKING USE OF PLASTIC-COATED OR SHEATHED WIRING AND WASTE WIRE FOR THE SEPARATE RECOVERY OF METAL AND PURE RECYCLABLE PLASTIC

TECHNICAL FIELD

The invention relates to a method for the recyling of plastic-coated or plastic-jacketed residues of cables and scrap of cables for the separate recovery of metal and of pure-type plastic capable of recycling, wherein the metal parts contained in the cables are separated from the jacketing and wherein the metals are recovered and wherein the plastics are processed such that they can be recycled as a metal-free recycled material of a pure type to a reuse as a pure plastic with the material properties of a new plastic material.

STATE OF THE ART

Cables forming electrical conductors generally comprise a metallic cable core and one or several strands, which are made predominantly from copper or aluminum and one or several cable jackets, which in general are produced of polyvinylchloride (PVC), wherein the individual metal strands can also be separately jacketed. For recovery of the high-value copper or aluminum from the residues of cables or from the scrap of cables, it is known to carbonize at high temperatures the plastic jacketing or to burn the plastic jacketing at high temperatures such that the metal core remains. In the carbonization at low temperature of plastics, in particular of polyvinylchloride PVC, there are generated however extremely damaging and poisonous waste gases, where the impact on the environment is no longer tolerated by the governmental authorities. The destruction of the valuable plastic is a further undesirable result of this method.

In the meantime, processes have widely spread, wherein the residues of cables or, respectively, the scrap of cables are comminutes to such an extent that the generated particle size does no longer allow any mechanical connection between metal and plastic. For example, such a method for the use of insulated cable residues has become known from the German printed patent document DE 3,529,322-A1, wherein the cable residues are cut by a comminuting machine to small parts such that already a substantial disintegration of metal and insulating material is performed. The comminuted material is transported into a separating plant by a blower, wherein the separating plant sorts the material by way of flushing with water. The separated material is collected in an overflow basin and the water is simultaneously used again as a supply of a pump with nozzles connected to the pump, whereby the different densities of metal and plastic are used for the separation.

Percentage purity grades are obtained in the separation of from 0.5 to 5% plastic in metal and of about 1 to 5% metal in plastic according to the state of the art. The remelting of the metal fraction is completely without problems, whereas the plastic fraction as a recycled material is substantially not capable of being used. The plastic fraction in general represents an uncontrolled mixture of very different plastics and can only be used for products of low quality in a downcycling step, where the market is substantially saturated for such low-quality products, and therefore, finally only the high-cost and environmentally detrimental dumping of the plastic wastes remains open. In particular, copper and copper salts operate as catalyst for the formation of dioxins on the dumping grounds or during the melting down of the plastic wastes. Therefore, the separation of metal and plastic out of cable scrap has to be considered to be very much a problem with or without a subsequent processing of the plastic residues according to the state of the art.

A method and a device for the separation of the plastic insulating material from metal conductors has become known in the German printed patent document DE 1,963,148, wherein the conductors are initially also cut in pieces, whereupon these pieces are immersed into a bath of a heated liquid, which does not chemically dissolve the insulation, whereupon the conductor pieces in the heated liquid are subjected to an impact load or shock load, releasing the softened insulating from the conductor pieces, for such a time until the materials of the jacket have been released from the metal. Thereupon, the complete charge is refilled into a separating container with two different liquids, which do not mix with each other or cannot dissolve in each other. The separating process occurs in such fashion that the metal particles sink down in the second liquid, which represents the separating liquid, whereas the plastic particles float on the separating liquid and collect thereby in the phase boundary face between the two liquids and thus can be separated. This process thus represents a discontinuous process.

Because however no organic solvent exists which is not soluble in another organic solvent or mixable in another organic solvent, there remains as a second separating liquid for technically realizable possibilities only water, which contains such an amount of salt that the density of the water is higher than the density of plastic to be separated. During the swelling process, phthalic acid compounds, used as a softener, as dissolved from the plastic, which phthalic acid compounds dissolve in the water upon contact with water or, respectively, enter into a suspension. Since the water is used up by the impurities in the course of the process, the water cannot be regenerated after using. A clean separation of the dissolved salts and of the impurities, derived from the plastic, is technically difficult and very cost intensive. The discharge to the waste water is hardly permissible at this time in the Federal Republic of Germany.

Furthermore, a method and a device for the use of plastic-coated cable residues has become known from the German printed patent document DE 3,340,273-A1, wherein the cable residues are entered into a bath, which contains a liquid swelling agent, which liquid swelling agent induces the plastic parts to swell and makes them brittle. Subsequent to the swelling process, the cable residues are fed to a washing station and are sprayed with sharp beams of spray nozzles, whereby the plastic jackets of the cable residues are shattered and crushed through the beam pressure. The plastic parts are separated by a separating device from the metal parts.

TECHNICAL OBJECT

It is an object of the present invention to provide a method and a device of the initially recited kind for the recovery and reclaiming of the metal core of cable wastes and cable scrap, where the cable wastes and cable scrap comprises preferably high-value electrolytic copper or aluminum and the plastics, forming the jacketing of cable residues and cable scrap of cable wastes and cable scrap, -wherein the method and device assure a problemless separation of the metal core from the plastic jacketing, wherein both the metals as well as the plastics are to be recovered in a clean form of pure type, wherein no impurities are to be discharged into the atmosphere or into the ground water during the performance of the method, and wherein all participating effective agents are to be processed and recovered.

A main goal comprises the recovery and recycling of a recycled plastic material, which resembles in its material properties to the material properties of a newly produced plastic of the same kind.

DISCLOSURE OF THE INVENTION AND OF ITS ADVANTAGES

The solution of the object is characterized by the following features according to the invention:

a) after the softening of the plastic, the mass flow is fed together with the swelling agent and/or solvent for the purpose of softening the plastic from the swelling container to at least one roller cone mill and/or cone crusher, which flexes the chopped material and exerts pressure forces and shearing forces on the chopped material and which mechanically destroys the macrostructure of the plastic components of the individual cable parts, and which uncovers more or less the metal core, b) then the residual metal particles are mechanically separated from the jacketings by way of stirring and/or spinning and/or centrifuging and/or swirling in a mechanical stirrer, c) then the now present three or more-phase mixture is transported into a metal sedimentor, wherein the heavier metal particles sink down based on gravity and separate themselves from the lighter plastic and possibly dirt particles, and wherein the metal particles are withdrawn at the lower end of the metal sedimentor from the metal sedimentor, d) the transport speed of the transport flow of the three or more-phase mixture is selected such within the metal sedimentor that the metal particles, according to their size-dependent different sinking speeds, sink down up to the exit out of the metal sedimentor or, respectively, up to the lower end of the metal sedimentor, e) a predeterminable countercurrent of swelling agent and/or solvent is entered into the transport flow, wherein the countercurrent discharges the lighter plastic particles and dirt particles from the transport flow and the metal particles sinking down in the transport flow, f) the countercurrent is led out of the metal sedimentor as a metal-free partial current together with the plastic particles and the dirt particles and is led into a plastic sedimentor for an extraction by sedimentation and for separating the plastic particles, g) all method steps are performed sealed against gas relative to the environment.

The present invention also provides for an apparatus for a continuous recycling of plastic-coated cable residues and cable scrap. Comminuting means are furnished for a mechanical comminution of cable scraps. A swelling container with swelling agent and/or solvent is provided for softening and stirring chopped and comminuted material, and there are including stirrer devices, impacting devices, and grinding devices, respectively, for separating/splitting of swollen plastic/metal compound by way of mechanical means. A gravity separator/sieve is furnished for separating a suspension comprising solvent/plastic/metal by gravity separation/sieving. A roller cone mill is disposed following to the swelling container and connected to the swelling container. A mechanical double arm stirrer follows to the roller cone mill for a mechanical separation of metal particles from residual jacketings. A metal sedimentor follows to the mechanical double arm stirrer for a separation based on gravity of metal particles as compared to plastic particles and possible dirt particles. A discharge port is disposed at a lower end of the metal sedimentor for removal of the metal particles from the metal sedimentor. A feed port is disposed at the metal sedimentor for feeding a countercurrent of swelling agent and/or solvent into the metal sedimentor for removal of the plastic particles and dirt particles from a transport flow and the metal particles sinking in the transport flow. A plastic sediment or follows to the metal sedimentor for receiving a countercurrent together with the plastic particles and dirt particles from the metal sedimentor as a metal-free part flow into the plastic sedimentor for a sediment-type depositing and separation of the plastic particles. All parts of the apparatus are sealed against gas relative to the environment.

Figure 2:
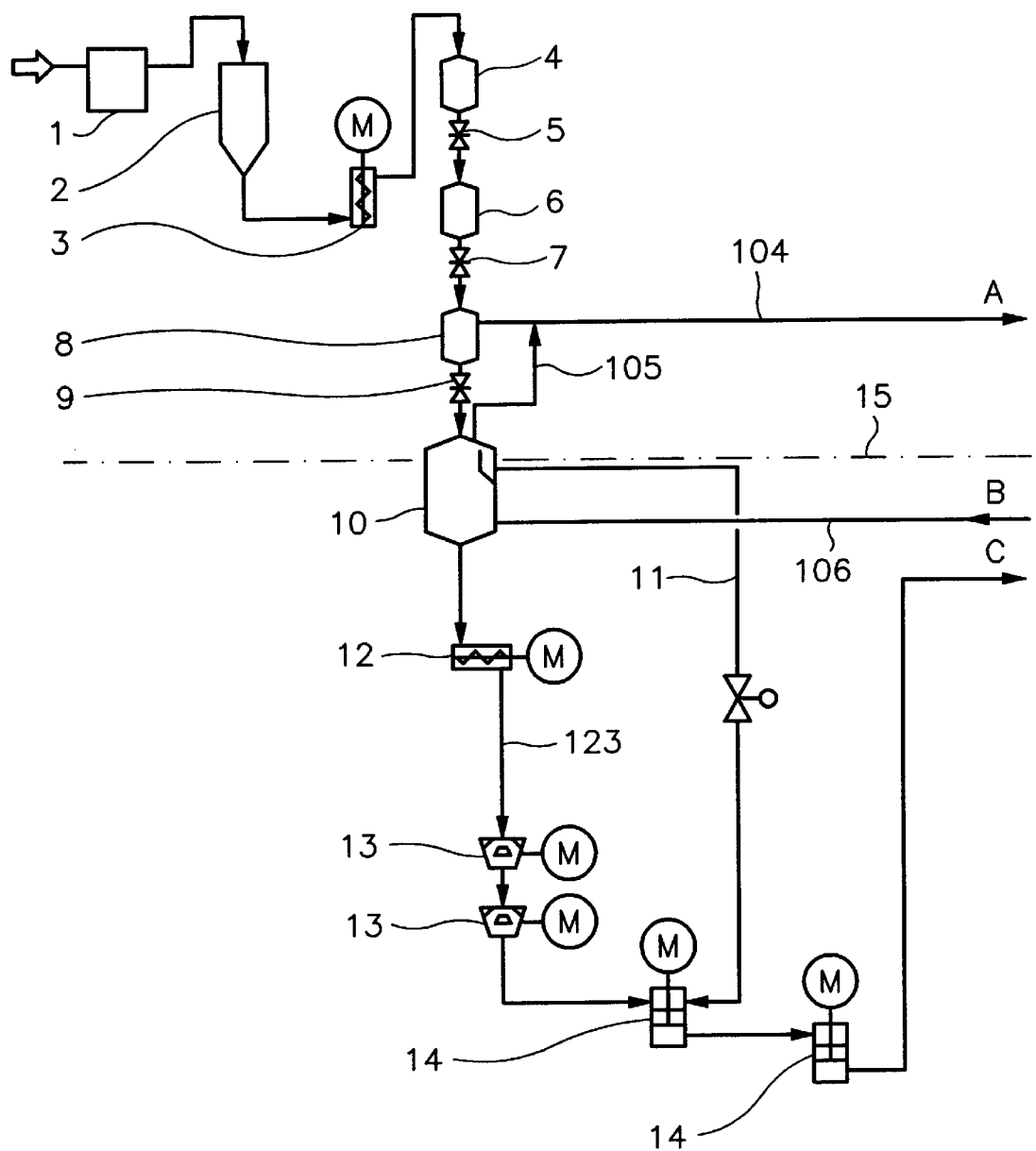
Figure 3:
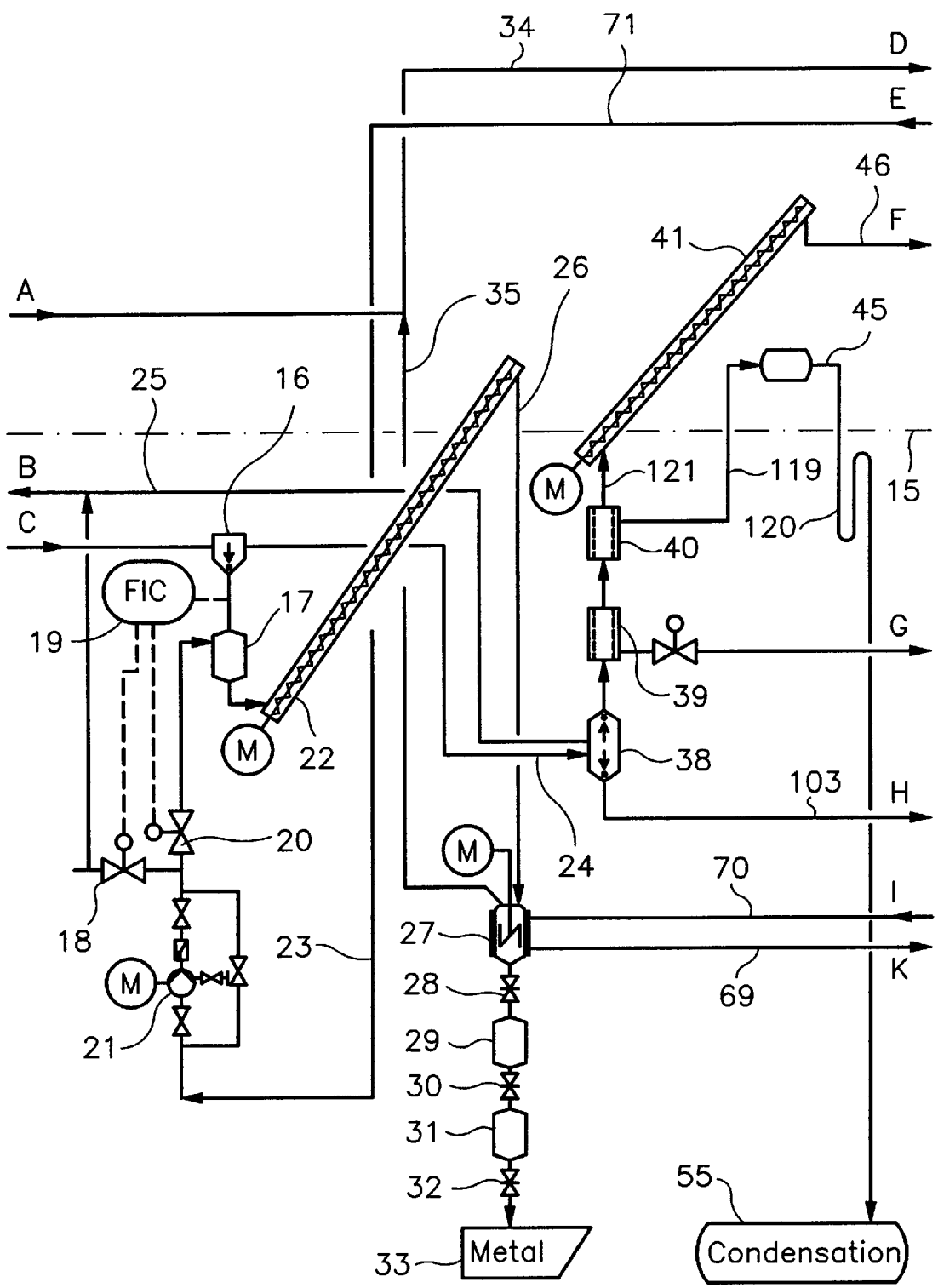
Figure 4:
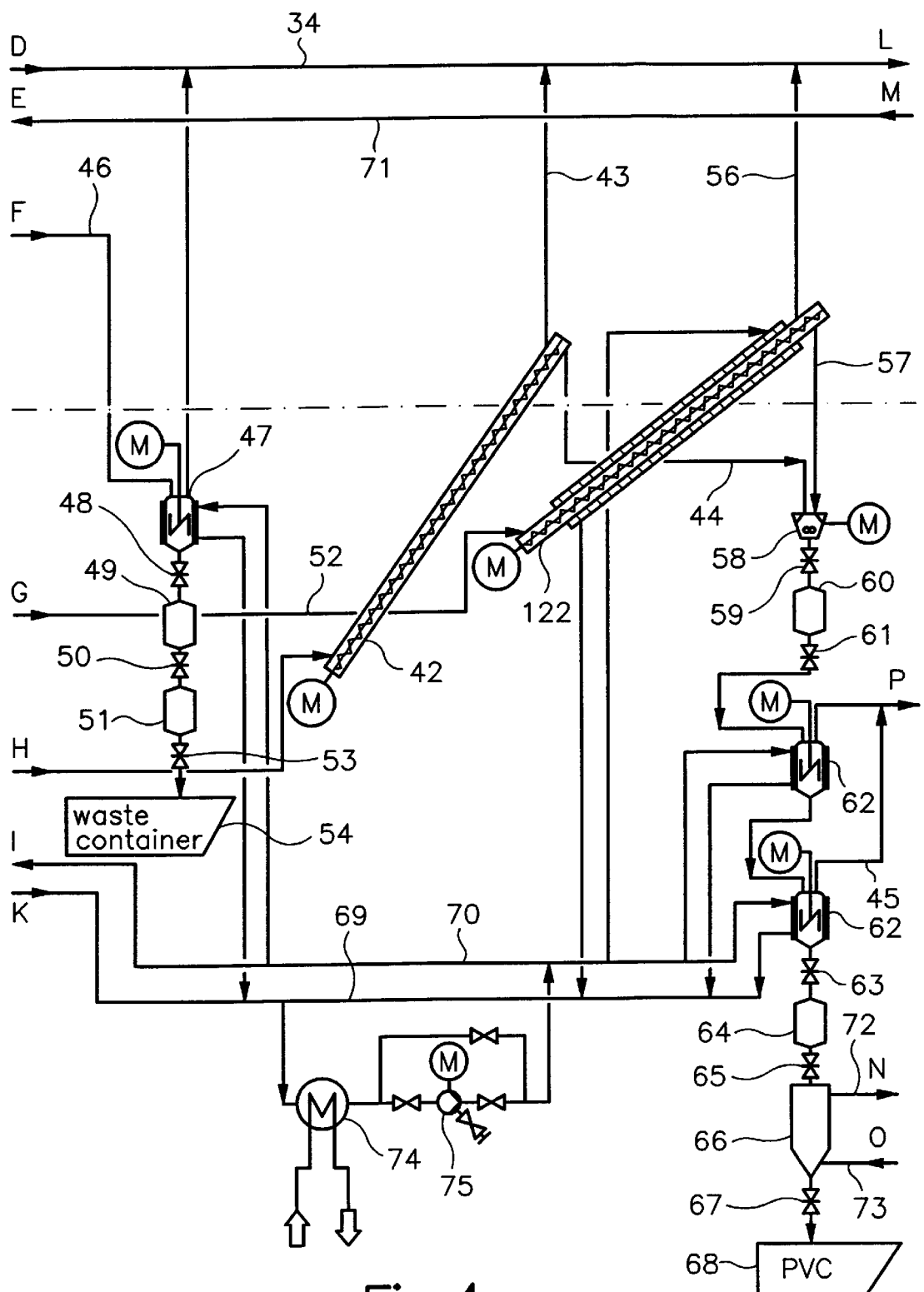
Figure 5:
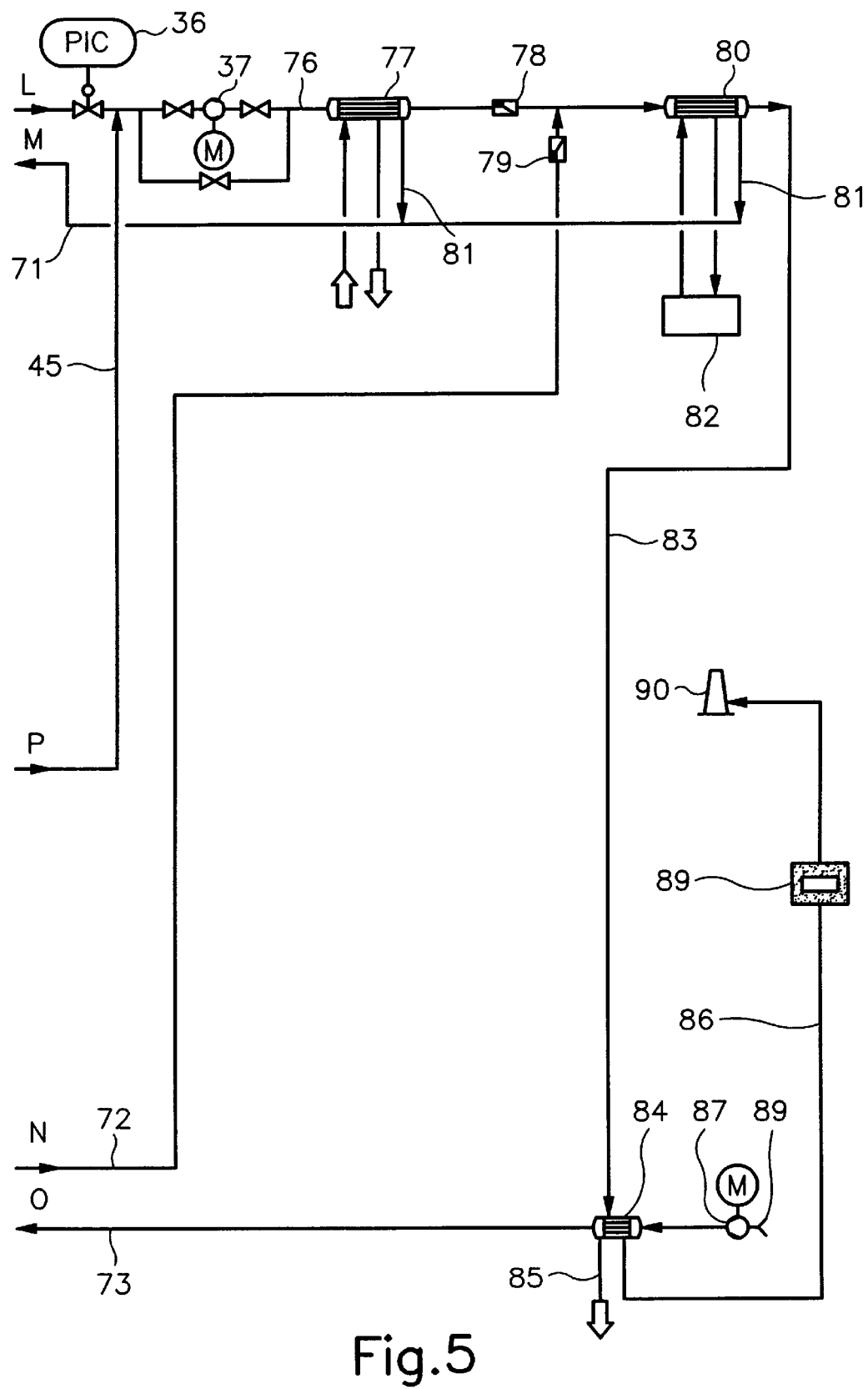
Figure 6:
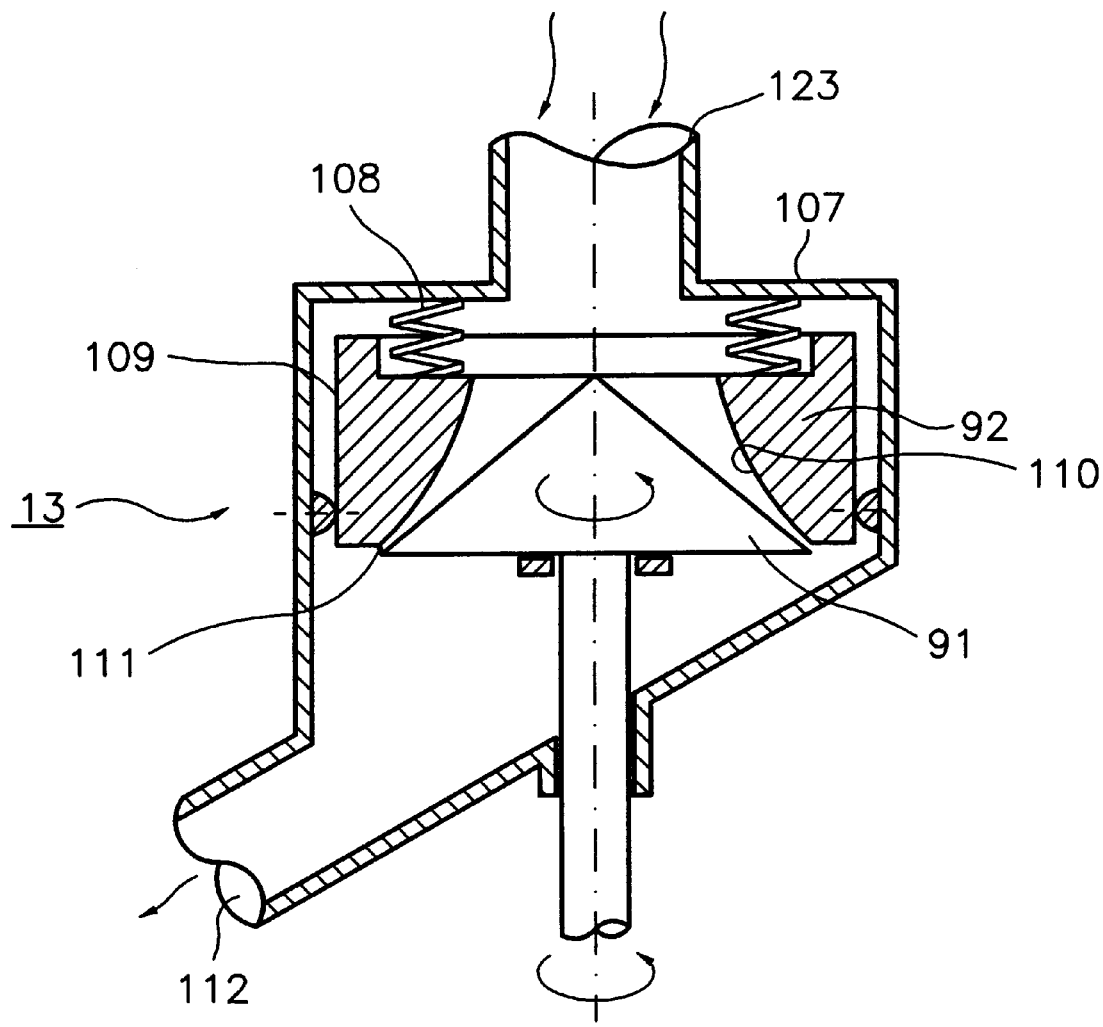
Figure 7:
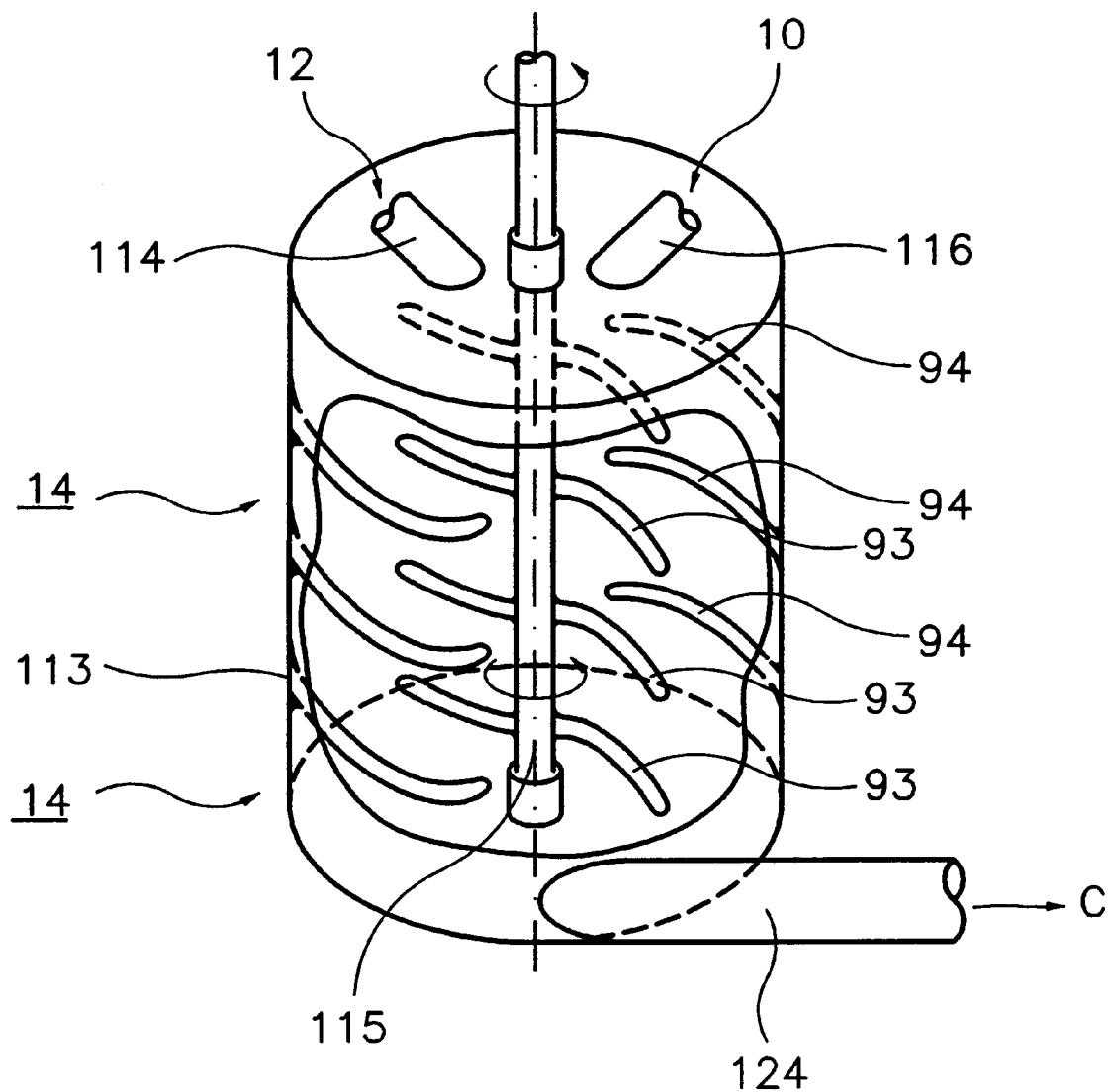
Figure 8:
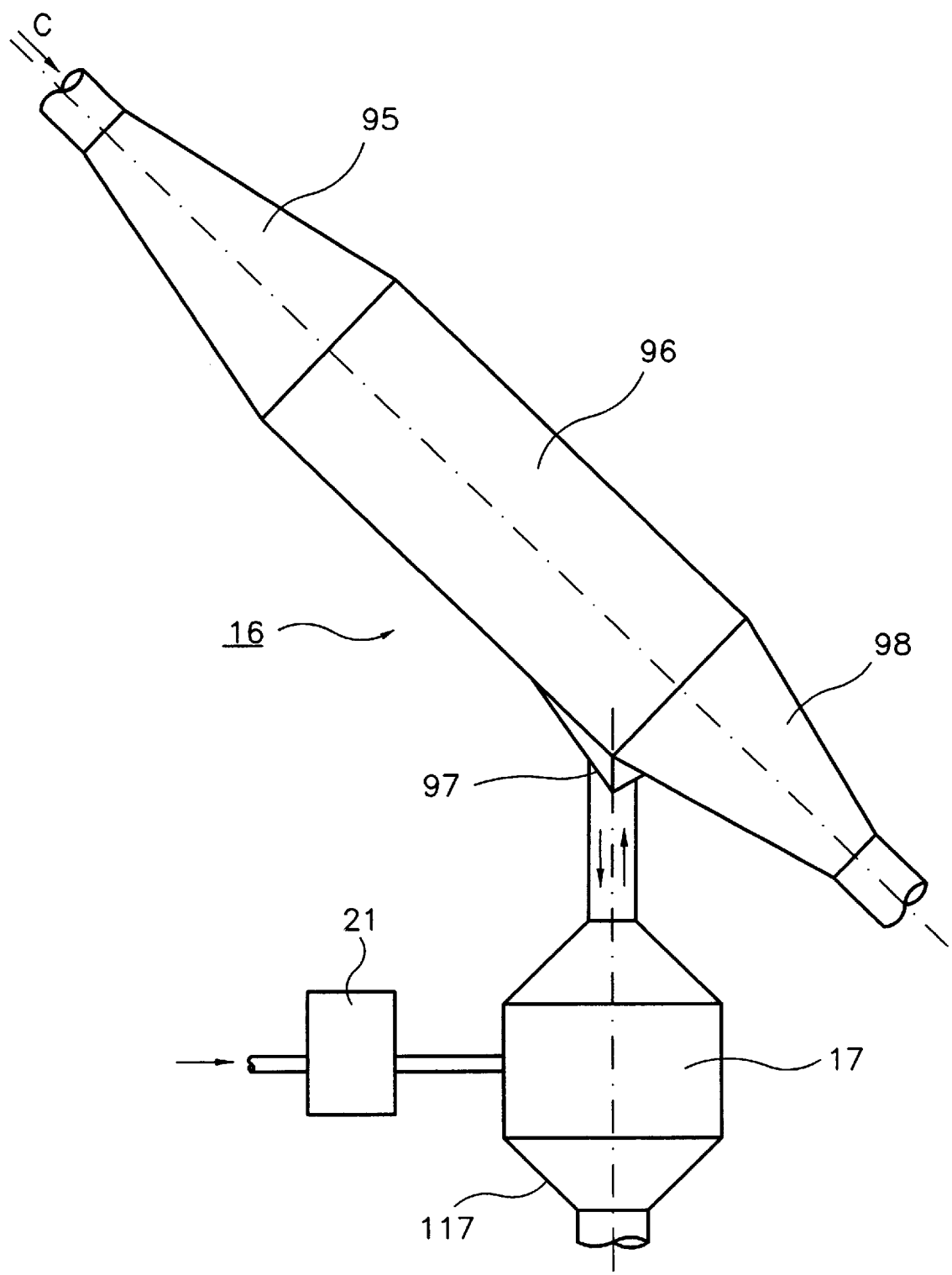
Figure 9:
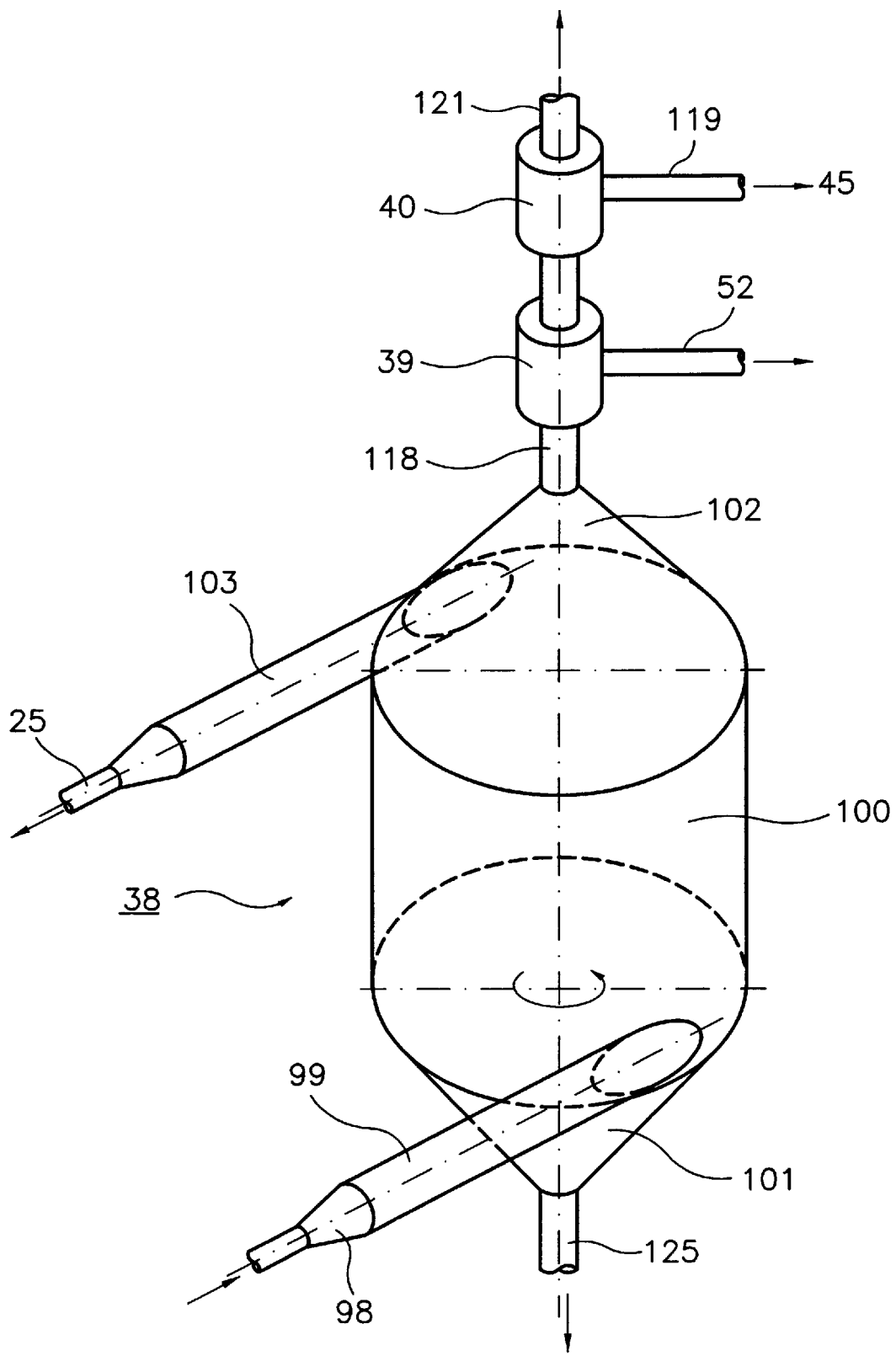

Brief description of the drawing, wherein there is shown:

FIG. 1, a base flow chart of the invention method,

FIG. 2, the first part of a technical plant for the performing of the method up to the lines with letters A, B, and C, FIG. 3, the second part of the plant with the further conduction of the lines A, B, C up to the lines D, E, F, G, H, I, K, FIG. 4, the third part of the plant with the further conduction of the lines D, E, F, G, H, J, K up to the lines L, M, P, N, O, FIG. 5, the fourth part of the plant with the further conduction of the lines L, M, P, N, O up to the lines J, K, I, G, FIG. 6, a cross-section through a roller cone mill according to the invention, FIG. 7, a view of a double-arm stirrer with curved rotor arms and stator arms, FIG. 8, a view of a metal sedimentor, and FIG. 9, a view of a plastic sedimentor.

Paths for Performing the Invention:

According to the base flow chart of FIG. 1, the cable scrap, furnished as small-cut, chopped material of a few centimeters length, is brought into the station "PRESOFTENING" together with a swelling agent and/or solvent, after which a separation of the metal, preferably copper, from the softened or, respectively, swollen plastic, preferably polyvinylchloride PVC, is performed in the station "SEPARATION CU/PVC." In the following station "SEPARATION CU," there is performed the separation of the metal from the plastic, whereupon the metal is cleaned in the station "CLEANING CU" and is dies in the following station "DRYING", and is led to the reuse. In the following station "SEGREGATING PVC," the segregation of the plastic is performed, where the plastic is then cleaned in the station "CLEANING PVC" and is dried in the station "DRYING PVC", and is then led to a reuse.

From the station "CLEANING CU," the mud and the swelling agent are separated in the station "SEPARATING MUD/SWELLING AGENT," and then the mud is dried in the station "DRYING MUD," and is led to an acceptable discharge.

Both from the stations "CLEANING CU," "CLEANING PVC," "DRYING PVC," "DRYING CU," as well as from the station "DRYING MUD," the swelling agent is fed to a station "SUCTIONING SWELLING AGENT" as well subsequently to the station "SEPARATING SWELLING AGENT," whereupon the swelling agent can be entered again into the station "PRESOFTENING." If it is necessary, the swelling agent is reprocessed in the station "REPROCESSING SWELLING AGENT" and is then again led to the cycle in the station "PRESOFTENING." In a similar way, the swelling agent can be led from the station "CLEANING CU" either to the station "REPROCESSING SWELLING AGENT" or directly again to the processing cycle. Possible residues of liquid from the station "PROCESSING SWELLING AGENT" are also led to an acceptable discharge.

A complete process flow chart of the invention method is shown in the following FIGS. 2 to 5 by way of the processing of copper cable scrap with polyvinylchloride PVC plastic jackets, wherein the illustration is consecutively subdivided onto the FIGS. 2 through 5.

The presorting of the cable is performed in the pretreatment station 1, wherein thick-core power cables, cables with steel jackets, oil cables, and cables with jackets, which are obviously not made of PVC, are previously sorted out and are processed according to the state of the art. The resulting polyvinylchloride PVC components of these cables are comminuted and are fed to the process described in the following. A small amount of erroneously sorted cables, which should not be more than 10%, can be tolerated by the method according to the invention or, respectively, by the apparatus. For the processing of the residues of cables and of the scrap of cables, these are cut into chopped material of a few centimeters of length and are led to a chopped-material bin 2, wherein the chopped-material bin 2 is to be dimensioned such that, with the amount stored in the chopped-material bin 2, preferably a 24-hour process course is assured. The chopped-material bin 2 is preferably of a funnel shape, wherein a transport worm 3 is disposed in its lower end, which transport worm 3 generates a continuous mass flow of chopped cable pieces for supplying the plant and transport these chopped cable pieces up to a height level above the liquid level 15 of the employed solvent in the plant. The transport flow is deflected into a collector container 4 by the transport worm 3, wherein the collector container 4 form the entrance station for a slider-closed, gas-tight chamber system. All following components of the processing plant are technically encapsulated in a gas-tight way.

Two sluice chambers 6 and 8 are disposed in series following to the collection container 4, wherein in each case slider 5, 7, and 9 are disposed between the sluice chambers 6 and 8, wherein the slider 9 is disposed following to the sluice chamber 8. If the sluice chamber 6 has been emptied based on a slider actuation of the slider 7, disposed following to the sluice chamber 6, then the slider 7 is closed and the slider 5 after the collection container 4 and before the sluice chamber 6 is opened. After closing the slider 7, the slider 9 can be opened, whereby now the sluice chamber 8 is emptied. The sluice chamber 8 is connected by a gas line 104 to the line for the solvent vapors A in order to prevent an exiting of the solvent vapors into the environment. A slight underpressure is set to prevail in a controlled way in the line 104 (A) for the solvent vapors. By actuating the slider 9, the chopped cable parts fall into a swelling container 10, which contains a solvent bath of dichloromethane or of another suitable organic solvent agent, which swells the plastic jackets of the chopped cable parts, which, however, neither dissolves or, respectively, removes the plastic jackets nor changes their chemical structure. The swelling container 10 is dimensioned such that the chopped cable parts remain at least for such a time in the swelling container 10 as it is necessary for the sufficient swelling of the plastic. The swelling container is constructed such that the chopped cable parts can pass through it in a uniform flow from the top to the bottom. The liquid level 15 within the swelling container 10 is disposed at about ¾ of the height level of the container. The free space of the swelling container 10, which is disposed above the liquid level 15, is connected with a line 105 to the line 104 for the solvent vapors A. In this case, a slight underpressure takes care that no solvent vapors can be emitted. A return line 106 for the solvent (B) from the plant is connected in the lower region of the swelling container 10.

The swelling container 10 can be dimensioned such that the swelling container 10 can accept the 1.5-fold volume of the hourly throughput of chopped material under the surface of the swelling liquid. In addition, the swelling container 10 can contain a sufficiently dimensioned vapor space, where the absolute pressure of the vapor space is maintained below 950 mbar.

A transport worm 12, disposed after the lower end or in the lower end of the swelling container 10 assures the required absolute continuous mass flow of swollen chopped cable parts in an apparent density to one or several roller cone mills or cone crushers 13, disposed successively, wherein the construction of the cone crusher is shown in detail in FIG. 6. It is essential that the swollen mixture is transported into the first cone crusher 13 in that bulk density, which contains only as much solvent as there is free space in the feed bulk. The material is flex-tumbled and milled in a defined way such that a uniform destruction of the present plastic jacket ensues. This described process is performed continuously.

A cell wheel sluice can be disposed at the output of the swelling container 10 instead of a transport worm 12, wherein the cell wheel sluice generates a continuous flow of mass of chopped material parts and transport the chopped material parts into the next following parts of the plant.

The construction of the cone crusher 13 is illustrated in FIG. 6. The roller cone mill 13 comprises a casing 107 having in principle a cylindrical shape, wherein the line 123 joins preferably from above from the transport worm to the casing 107. A flexing cone 91 is rotatable around an axle and is disposed within the casing 107, wherein the axle of the flexing cone 91 is driven by a motor. A linking connector 92 is placed from above onto the flexing cone 91, wherein the linking connector 92 is spring-loaded by way of springs 108 on the flexing cone 91, such that the tip of the flexing cone protrudes into the linking connector 92. The linking connector 92 comprises in principle a ring, which ring is supported movably up and down on its outer circumferential jacket wall 109 in an upper part of the casing 107 of the roller cone mill 13, such as it is illustrated in FIG. 6. The inner circumferential jacket surface 110 of the linking connector 92 is curved in convex shape and forms with the cone-shaped surface of the flexing cone 91 a circumferential slot 11, which becomes increasingly narrower toward the outside. The roller cone mill 13 is constructed such that it organizes the swollen plastic jackets independent of the diameter of the passing-through chopped cable parts in radial position relative to the flexing cone 91, and flexes the plastic jackets upon rotating based on a rotation of the flexing cone 91 against the spring-supported linking connectors 92 such that the plastic jackets are broken up and the cores of the cables are loosened, however without grinding the plastic jackets or the cable cores.

The flexed, chopped cable parts leave the casing 107 of the roller cone mill 13 at the lower outlet 112 based on gravity forces and the flexed, chopped cable parts are transported in following single-stage or multi-stage double arm stirrers 14, which are illustrated in FIG. 7 and which are described in the following. A bypass line 11 with a flow-through control joins into the swelling container 10 at a position below the liquid level 15 of the swelling container 10, wherein the bypass line 11 is connected at least at the first double arm stirrer 14 in order to provide for a controlled liquid supply of the double arm stirrers 14 with swelling liquid.

Such a double arm stirrer 14 comprises in principle a cylindrical container 113 with the upper inlets 114, 116. Spirally or twistedly bent, fixed stator arms 94 are disposed inside of the container, wherein the stator arms 94 are distributed uniformly preferably over the height and over the circumference of the container 113. An axle 115 is rotatably disposed inside the container 113 and aligned with the direction of the longitudinal axis of the container 113, wherein spirally or twistedly bent rotor arms 93 are disposed at the axle 115, wherein the rotor arms 93 are capable to run inbetween the stator arms 94 in case of a rotation of the axle 115, as is illustrated in FIG. 7. The double arm stirrers 14 perform in principle three functions. They are dimensioned such and are operated at such a rotation speed that the passing-through, swollen chopped cable parts are impacted after the flexing with such a large number of pulses of defined size that the metal cores are cleanly separated from the swollen plastic and the plastic particles are at the same time washed free of ground metal parts. At the same time, a volume flow of free solvent is added in a controlled way on the suction side of the bypass line 11 (FIG. 2), wherein the volume flow is necessary in order to be able feed all solid particles, namely metal wires and plastic particles, without sedimentation effect through the line C, which means the outlet or exit port 124 of the last double arm stirrer 14, to the following plant parts. The exit port 124 can be provided as a spirally running discharge port 124. The pump effect of the double arm stirrers 14 relies on the pressure increase based on the rotation of the transported material. The casing 113 is constructed together with the arrangement of the feed port and the discharge port 114, 116 such that, on the one hand, the passing particles, i.e. plastic and metal, pass over the required minimum path lengths and that, on the other hand, however, despite the braking effect of the stator rods 94, the rotary motion of the transported material is still so high that a sufficient pressure increase for the required pump effect is obtained. This pump effect has to be dimensioned such that the speed, obtained in the line C, of the generated three-phase mixture assures a full turbulence for the carrying along of all solid component parts.

Instead of the double arm stirrer 14, other mechanical separating apparatus can also be employed such as, for example, cross stirrers, which also definitely separate the swollen plastic from the copper based on flow forces and mechanical pulses.

The three-phase mixture is transported according to FIG. 3 by the double arm stirrers 14 through the line C into a metal sedimentor 16, wherein the metal sedimentor 16 is shown in detail in FIG. 8. The metal sedimentor 16 comprises an obliquely downwardly inclined diffusor 95, which exhibits in principle a downwardly opening, funnel-shaped form, where a tube 96 of a defined length and of a defined diameter follows to the diffusor 95 with the same inclination angle as the diffusor 95. The tube 96 is dimensioned such that up to the exit port 96, joined at the bottom of the tube 96, also the finest generated metal particles have sunk to the bottom. The inclination angle of the diffusor 95 and of the tube 96 is dimensioned according to the sliding friction of the metal particles on the tube wall in order to assure a clean sliding down of the sedimented metal particles. The metal sedimentor 16 is dimension in its height and length such that metal and plastic separate with certainty based on their different sinking behavior during the sinking process of the individual parts.

The sedimented metal particles fall into the discharge port 97, where a metal collection container 17 follows to the discharge port 97. Since, however, also plastic particles have sunk simultaneously to the bottom, these plastic particles also pass into the discharge port 97. Based on an automatic flow control 19, such a metered volume of regenerated, pure solvent is fed with a pump 21 and a then following automatic control valve 20 to the metal collection container 17, as it necessary for a defined upward flow of solvent from the metal collection container 17 through the discharge port 97. This upward flow is smaller in its speed than the sinking speed of the finest metal particles, however, larger than the highest sinking speed of the largest plastic particles. Based on the countercurrent, the floating materials, i.e. plastic and dirt particles, are flushed upwardly, the metal particles in contrast sink with a reduced sinking speed downwardly. Thereby, the plastic and dirt particles are flushed back into the main flow of the solvent and leave the metal sedimentor 16 together with all possibly present water droplets, paper shreddings, and textile fibers, through a discharge funnel or, respectively, an exit port 98 at the lower end of the tube 96 after the discharge port 97, as is shown in FIG. 8. The discharge funnel 98 is preferably aligned in a direction identical to the direction of the diffusor 95 and the tube 96.

A viewing glass can be disposed in the discharge port 97 for visual control of the sinking and flushing process within the metal sedimentor 16.

The metal particles sink through the discharge port 97 in the metal collection container 17 into a collector funnel 117 disposed at the lower end, wherein a transport worm 22 (FIG. 3) is connected at the lower tip of the collector funnel 117. The transport worm 22 transports the metal particles over the liquid level 15 of the plant, wherein the solvent is sieved off and dripped off. The metal particles from the liquid level fall into a one-stage or multi-stage drying system 27 according to the state of the art, which is connected through a line 35 with the line for the solvent vapor 34 and which is supplied with heating agent through two heating lines 69 and 70. The line 35 leads the solvent vapors generated during the drying away. The dried metal is transported into a transport container 33 for metal by a gas-tight slider-closed chamber sluice system comprising a slider 28 following to the dryer 27, a chamber sluice 29, a slider 30, a chamber sluice 31 as well as a slider 32. In principle, the metal is recovered by this process.

The now metal-free mixture of solvent, plastic, and impurities flows after passing the metal sedimentor 16 through a connector 24 from the metal sedimentor 16 into a plastic sedimentor 38, which is shown in detail in FIG. 9 The plastic sedimentor 38 takes advantage of the different densities of the different plastics, employed in the jacket material, in the ratio relative to the solvent. While polyvinylchloride PVC has a density which is larger as compared to the solvent, and thus sinks in the solvent, other polyolefines, paper, and textile fibers exhibit a density which is less than the density of the solvent. These materials float on top and can thus be separated from the polyvinylchloride PVC. Thus, a clean separation of the polyvinylchloride PVC is provided. Since, caused by the preceding storage of the processing material, this processing material can have become moist based on precipitations and since, on the other hand, air humidity present as water and resulting during the process occurs in very small amounts, this water is also separated at this location.

The plastic sedimentor 38 according to FIG. 9 comprises a cylindrical central container 100, which exhibits on top a collection funnel 102 and at the bottom a funnel-shaped floor 101 with a discharge pipe 125. A diffuser 98 is disposed horizontally for purposes of decreasing the flow at the lower end of the central container 100 above the funnel-shaped floor 101. A horizontal tube 99 of a defined length and of a defined diameter follows to the diffusor 98, which horizontal tube 99 tangentially joins the central container 100. This tube 99 is dimensioned such that the largest part of the plastic, preferably more than 99%, deposits already therein on the bottom of the tube 99 and is carried out with the flow through the discharge pipe 125 of the funnel-shaped floor 101. Based on the tangential joining of the tube 99 into the central container 100, the flow generates a rotary motion with a secondary flow. Even the finest plastic particles are thereby collected by the generated "tea-cup" effect in each case in the center of the funnel-shaped floor 101, the polyvinylchloride PVC particles with a density larger than the solvent, and in the center of the upper collection funnel 102, water droplets, paper shreddings, textile fibers, and other polyolefines with densities smaller than the density of the solvent. A horizontal discharge port 103 is disposed in the upper region of the central container 100 and is again tangentially disposed relative to the central container 100. This discharge port 103 serves to the discharge of the sedimented-off solvent for maintaining the rotary motion and is also tangentially disposed at the central container 100 and rests at a defined height level above the feed-in 99, in order to assure both a very calm sedimentation flow and also to fully exploit the tea-cup effect. The discharge port 103 joins into a pipe line 25, which feeds the sedimented-off solvent to the reuse through the line B—B in the FIGS. 2 and 3 to the swelling container.

A port 118 with a flange is disposed at the tip of the upper collection funnel 102, where a parallel-flow filter 39 is placed on the flange port 118. An exactly automatically controlled volume of a solvent is withdrawn from the plant through this parallel-flow filter 39 and a pipe line 52, connected laterally relative to the parallel-flow filter 39, wherein the volume of solvent withdrawn is necessary in order to maintain the effectiveness of the solvent. Softener, sliding agents, and fillers are dissolved in a limited amount from the jacket material during swelling of the jacket materials. The solvent looses increasingly the capacity to swell the jacket materials with increasing concentration of said components in the solvent. The volume of dissolved admixed materials of the jacket material is discharged automatically through the parallel-flow filter 39 into the line 52 based on the soiled solvent volume, wherein the discharged volume of dissolved admixed materials of jacket material is necessary in order maintain the concentration of the impurities below a level which safely assures the swelling capability of the solvent.

A second parallel-flow filter 40 of the same construction can be disposed above the parallel-flow filter 39, wherein the second parallel-flow filter 40 exhibits a laterally connected pipe line 119. The parallel-flow filter 40 is positioned relative to the liquid level 15 of the plant such that water with a lower density as compared to the density of the solvent floats on the solvent. With an increased water level in the filter system 39, 40, the phase boundary between water and solvent is lowered. If the water level reaches an overflow container 45, which is connected to the line 119 of the parallel-flow filter 40, then the water flows through a following siphon line 120, which prevents the exiting of solvent vapors into the environment, and which leads to a condensed-water container 55. Paper shreddings, paper fibers, plastic particles of polyolefines, which are not polyvinylchloride PVC, collect in the phase boundary between water and solvent. If possibly entrained condensed water and precipitated water has flown off through the overflow container 45, then the phase boundary protrudes into a transport worm 41, disposed following to the parallel-flow filter 40, wherein the transport worm 41 is connected to a branching-off line 121 of the parallel-flow filter 40 (FIG. 4). The transport worm 41 transports all solid particles, reaching the transport worm 41, through the liquid level 15 of the plant, sieves the solvent off, and transports this waste through a line 46 (F) into a drying system 47 according to the state of the art.

According to FIG. 4, the drying system 47 comprises one or several arbitrary dryers. The drying system 47 dries the waste and transports the waste through a gas-sealed, slider-closed chamber sluice system, comprising a dryer system 47, a then following slider 48, a then following chamber sluice 49, a then following slider 50, a then following chamber sluice 51, a then following slider 53, wherein the chamber sluice system prevent the exiting of the solvent vapor into the environment, into a waste container 54. The generated waste represents usual industrial waste and is usable according to corresponding classification, at least to its largest part according to the DFFD.

The solvent volume, metered for purposes of recovery through a line 52 (G), is evaporated in a jacket-heated drying conveyor worm 122. In this context, the softeners, the sliding agents, and other components, passed into solution, polymerize as cloudy and flocky layer at the dryer wall of the dry transport worm 122. The generated solvent vapors are discharged through a line 56 at the output of the dry transport worm 122, whereas the generated polymer flakes are scraped from the dryer wall and are transported through a discharge line into a motor-operated plastic defibrator 58, disposed following to the dry transport worm 122. The polymer flakes with the swollen, wet polyvinylchloride PVC are finely ground within the plastic defibrator 58, whereby the polymer flakes are again solvated on the surface of the polyvinylchloride PVC particles and are returned into the polyvinylchloride PVC. Their return guarantees the original quality of the polyvinylchloride PVC recycled material to be obtained.

A transport worm 42 transports the dripping-wet plastic particles from the lower collection funnel 101 of the plastic sedimentor 38 over the liquid level 15 of the plant, sieves the excessive solvent away, and transports the plastic through a line 44 into the plastic defibrator 58. The polyvinylchloride PVC particles together with the polymer flakes are finely ground for the preparation of the drying together in the plastic defibrator 58. A line 43 at the end of the transport worm 42 represents the connection of the entire system to the line for the solvent vapor 34 (D–L in FIG. 4) and prevent uncontrolled pressure variations.

The prepared polyvinylchloride PVC granulate is transported from the plastic defibrator 58 through a gas-sealed, slider-type chamber sluice system, comprising a slider 59, a following chamber sluice 60 and a then following slider 61, into a preferably multi-stage drying system 62 according to the state of the art. The heating of the drying system 62 is performed through heating lines 69 and 70.

The generated solvent vapor is drawn through a line 45 into the main line for the solvent vapor (P FIG. 4; L FIG. 5). While only a small underpressure is maintained in the line 34, the drying of the polyvinylchloride PVC granulate occurs at a higher vacuum. A pressure control according to FIG. 5 in the line 34 is assured by an automatic control device 36. A vacuum pump 37 takes care of the mass flow of released or, respectively, generated solvent vapors, and presses these solvent vapors into a line 76.

The dried, however still with absorbed solvents coated polyvinylchloride PVC granulate is transported according to FIG. 4 after the dryers 62 into a chamber sluice system 63, 64, 65, and passes from there into a desorption container 66, wherein the desorption container 66 is dimensioned such that the desorption container 66 can intermediately store the now dried, desorbed polyvinylchloride PVC granulate for such time until the dried, desorbed polyvinylchloride PVC granulate does no longer desorb any residual amounts of solvent to the environment after passing this desorption container 66. For assuring this function, the desorption container 66 is slider-sealed against gas with a slider 67, disposed at the lower output of the desorption container 66. The desorption container 66 is supplied with dehumidified fresh air of a sufficient volume flow through a line 73 for the desorption, wherein the fresh air preferably enters in the lower region of the desorption container 66 into the desorption container 66 and wherein the fresh air leaves the desorption container 66 again through a line 72, preferably in the upper region of the desorption container 66. The slider 67 at the output of the desorption container 66 is opened only in order to withdraw desorbed polyvinylchloride PVC granulate charge batch by batch. During this time, the feed of desorption air is interrupted through the line 73.

The vacuum pump 37 in FIG. 5 transports the solvent vapor in the line 76 into a heat exchanger 77, which operates with environmental heat on the cold side (water or air) at temperatures on the cold side of below 303 degrees Kelvin (below 30 degrees Celsius) and condenses thereby the largest part of the solvent from the solvent vapor. The now liquid solvent flows based on gravity through lines 81 and 71 to the pump 21.

The second discharge flow of the desorption container 66 is admixed through a line 72 (N FIG. 5) and a check valve prevention system 79 within the line 72 to the discharge flow after the heat exchanger 77 and behind the check valve prevention system 78. Then the waste gas is pressed into a heat exchanger 80. The heat exchanger 80 assures a low temperature cooling of the waste gas flow in an arbitrarily formed deep-cooling system 82. The largest part of the solvent vapor still present is condensed out of the waste gas and flows through a line 81 into the line 71.

The now very cold waste gas flow is transported through a line 83 to a heat exchanger 84 and warmed on the warm side relative to fresh air. After passing the heat exchanger 84, the waste gas is transported through a line 86 into an absorption filter 89, where the last residues of solvent are withdrawn from the waste gas. The thus cleaned waste gas is discharged through a chimney 90 into the environment. The fresh air for the desorption air flow is sucked through a suction port 88 by a blower 87 and is cooled in the heat exchanger 84 following to the blower 87 in order to condense the humid air present in the fresh air. The condensation water is discharged through a line 85, and the now dried air is furthermore pressed into the line 73.

COMMERCIAL APPLICABILITY AND USEFULNESS

The invention method and the apparatus according to the invention are useful in the recycling industry for recovery of pure copper or, respectively, metal as well as of pure plastic.

The invention method and the apparatus are associated with the important advantage that, after passage of the process steps through the apparatus, both the metal and the plastic are present in a separated, pure-sorted form, wherein the plastic is not soiled by the presence of heavy metals or other dirt; the plastic of a pure type is obtained in an extrudable shape. In a highly advantageous way, the recycled plastic resembles the new plastic of the same kind in its properties as a material. A further aspect of the usefulness comprises that the entire plant in all process stages is hermetically sealed, such that no vapors of the swelling agents and/or of the solvent can penetrate to the outside into the atmosphere or that harmfully contaminated liquids can penetrate into the waste water. Furthermore, it is an advantage that the separation of metal and plastic occurs in principle by physical/mechanical process steps and that the swelling agent and/or solvent are used only for the swelling of the plastic, that however the swelling agent and/or solvent does not enter into combining with the plastic. Preferably, dichloromethane or a similar swelling agent and/or solvent is employed as a swelling agent and/or solvent.

| List of reference numerals: | |
| --- | --- |
| 1 | pretreatment station |
| 2 | chopped material bin |
| 3 | transport worm |
| 4 | collection container |
| 5, 7, 9 | slider |
| 6, 8 | sluice chambers |
| 10 | swelling container |
| 11 | bypass line |
| 12, 22, 41, 42 | transport worms |
| 13 | roller cone mill, cone crusher |
| 14 | double arm stirrers |
| 15 | liquid surface level or, respectively, liquid level |
| 16 | metal sedimentor |
| 17 | metal collection container |
| 19 | automatic flow control |
| 20 | automatic control valve |
| 21 | pump |
| 24 | connector |
| 25 | pipe line |
| 27 | drying system |
| 28, 30, 32 | slider |
| 29, 31 | chamber sluice |
| 33 | transport container for metal |
| 34 | line for solvent vapor |
| 35, 43, 46, 52, 56 | lines |
| 36 | automatic control device |
| 37 | vacuum pump |
| 38 | plastic sedimentor |
| 39, 40 | parallel-flow filter |
| 45 | overflow container |
| 47 | drying system |
| 48, 50, 53, 59, 61, 67 | slider |
| 49, 51 | chamber sluice |
| 54 | waste container |
| 55 | condensed-water container |
| 57 | output line, outlet |
| 58 | plastic defibrator |
| 60 | chamber sluice |
| 62 | drying system or, respectively, dryer |
| 66 | desorption container |
| 69, 70 | heating lines |
| 71, 72, 73, 76, 81, 83 | lines |
| 77, 80, 84 | heat exchanger |
| 78, 79 | check valve prevention system |
| 82 | deep-cooling system |
| 85, 86 | line |
| 87 | blower |
| 88 | suction port |

-continued

List of reference numerals:

| | |
|---|---|
| 89 | absorption filter |
| 90 | chimney |
| 91 | flexing cone |
| 92 | linking connector |
| 93 | rotor arms |
| 94 | stator arms |
| 95 | diffusor |
| 96 | tube |
| 97 | discharge port |
| 98 | exit funnel or, respectively, exit port |
| 99 | horizontal tube |
| 100 | central container |
| 101 | funnel-shaped floor of the central container |
| 102 | collection funnel |
| 103 | discharge or, respectively, discharge port |
| 104 | gas line |
| 105 | line |
| 106 | return line |
| 107 | housing |
| 108 | springs |
| 109 | outer circumferential jacket wall |
| 110 | inner circumferential jacket surface of the linking connector |
| 111 | circumferential slot |
| 112 | lower outlet |
| 113 | cylindrical container |
| 114 | upper inlet of the container, inlet port |
| 115 | axle |
| 116 | discharge port |
| 117 | collector funnel |
| 118 | port with flange |
| 119 | pipe line |
| 120 | siphon line |
| 121 | branching-off line |
| 122 | dry transport worm, drying conveyor worm |
| 123 | line |
| 124 | outlet, exit port |
| 125 | discharge pipe |

What is claimed is:

1. A method for a continuous recycling of plastic-coated cable residues and cable scrap, comprising the steps mechanically comminuting cable residues, softening chopped material in a swelling container (10) with a swelling agent and a liquid solvent, respectively, feeding the chopped material, swollen to at least one roller cone mill (13), breaking open components comprised of plastic jackets and loosening components comprised of wire cores, where however a grinding of the components does not occur, separating and splitting up swollen plastic/metal compound by way of mechanical means including one of stirring, impacting, and grinding, performing the separating/splitting with a double arm stirrer (14), and performing a separation of a suspension including liquid solvent/plastic/metal by gravity deposition/sieving, and performing the separation of the suspension by way of a metal sedimentor (16), wherein metal particles sink down based on gravity and separate themselves from lighter plastic particles and possible dirt particles, and wherein the metal particles are withdrawn at a lower end of the metal sedimentor (16) from the metal sedimentor (16), and wherein a transport speed of a transport flow of a three or multi-phase mixture within the metal sedimentor (16) is selected such that the metal particles, according to their size-dependent different sinking speeds, sink to an exit from the metal sedimentor (16) or, respectively, the lower end of the metal sedimentor (16), wherein a predeterminable countercurrent of swelling agent and/or the liquid solvent is entered into the transport flow, wherein the countercurrent flushes the lighter plastic particles and dirt particles from the transport flow and the metal particles sinking down in the transport flow, and the countercurrent together with the plastic particles and the dirt particles is led out of the metal sedimentor (16) as a metal-free part current and is led into a plastic sedimentor (38) for a sediment-like extracting and separation of the plastic particles, drying in a closed circuit, wherein the liquid solvent is recovered, performing all method steps sealed against gas relative to the environment.

2. The method according to claim 1, wherein the swelling agent, circulating in a closed circuit, is sucked off from stations of metal purification and plastic purification and from metal drying and plastic drying stations, respectively, and is separated in a separating station in a cleaning process, and is subsequently led again into the swelling container (10).

3. The method according to claim 2, wherein the metal particles are transported after the metal sedimentor (16) into a metal collection container (17), wherein the metal particles are lifted by way of a transport worm (22) above a liquid surface level (15) of a plant from the metal collection container (17), wherein the metal particles are subsequently dried in a drying system (27), and wherein the metal-particles are discharged through a discharge chamber system (28, 29, 30, 31, 32) into a metal container (33).

4. The method according to claim 3, wherein the plastic particles which are dripping wet are lifted with the plastic sedimentor (38) above the liquid level (15) of the plant and are sieved from excess liquid solvent with a transport worm (42), and are then finely ground with a plastic defibrator (58), and are subsequently dried.

5. The method according to claim 4, wherein the plastic particles are a polyvinyl PVC granulate, and wherein the dried, however still with absorbed liquid-solvent coated polyvinylchloride PVC granulate is separated in a chamber by way of a chamber sluice system (63, 64, 65) and transported into a desorption container (66), wherein the desorption on container (66) is supplied with dehumidified fresh air for desorption, and wherein the desorbed polyvinylchloride PVC granulate is removed from the desorption container (66).

6. The method according to claim 4, wherein the plastic particles are polyvinyl PVC particles, and wherein a volume of liquid solvent together with impurities is evaporated for recycling in a jacket-heated dry transport worm (122), wherein softener, sliding agent, and other materials passed into the liquid solvent are polymerized out as a flocky layer, whereupon polymer flakes together with the polyvinylchloride PVC particles, which are still wet from swelling, are ground, whereby the polymer flakes are again solvated on a surface of the polyvinylchloride PVC particles and can be returned into the polyvinylchloride PVC, whereby a quality of polyvinylchloride PVC recycled material to be recovered is obtained according to the qualities of the original polyvinylchloride.

7. The method according to claim 6, wherein
the countercurrent is led within the metal sedimentor (16) as a part flow out of the metal sedimentor (16) and is led into the plastic sedimentor (38), wherein suspended materials, softener oils, and floating impurities float as an impure layer in the plastic sedimentor (38) and are separated from the plastic particles, wherein the impure layer is led in a partial volume flow out of the plastic sedimentor (38) and is lifted above the liquid level (15) of the plant and is guided into a heatable transport worm (122) and is died.

8. The method according to claim 6, wherein
a mass flow led into the plastic sedimentor (38) is tangentially entered at a lower end of the plastic sedimentor (38) such that the liquid within the plastic sedimentor (38) rotates and generates a secondary flow, whereby the largest part of the plastic particles, with a density larger than that of the solvent, is deposited at a floor (101) of the plastic sedimentor (38), and is discharged with the flow through a discharge pipe (125) of a floor (101) below a flow-in opening, and is transported in the transport worm (42), wherein the transport worm (42) lifts the plastic particles above the liquid level (15) of the plant and feeds the plastic particles, which are swollen-wet, to a plastic defibrator (58), whereas a member of the group consisting of contamination, water droplets, paper shreds, textile fibers, and polyolefins, having densities smaller than that of the liquid solvent, are collected in an upper tip of the plastic sedimentor (38) and are led by way of a second transport worm (41) from the plastic sedimentor (38), which contamination is subsequently dried in a dryer (47) and is transported outside through a chamber sluice system (48, 49, 50, 51, 53).

9. The method according to claim 6, wherein
a vacuum pump (37) transports a solvent vapor through a line (76) into a heat exchanger (77) for recovery of the liquid solvent from a desorption container (66), wherein the heat exchanger (77) employs environmental thermal capacity on the cold side of water and air, respectively, at temperatures on the cold side of below 303 degrees Kelvin and below 30 degrees Celsius and condenses thereby a largest part of the liquid solvent out of the solvent vapor, whereupon the liquid solvent flows back through lines (81) and (71) to a pump (21) into the closed circuit by way of gravity, and wherein a second waste gas flow of the desorption container (66) is admixed within a line (72) to a waste gas flow after the heat exchanger (77).

10. The method according to claim 9, wherein
the liquid solvent, condensed out of the solvent vapor, forms a waste gas, wherein the waste gas is pressed into a heat exchanger (80), which assures a low-temperature cooling of the waste gas, whereby a largest part of the solvent vapor still present is condensed out of the waste gas and is returned through a line (81) to the closed circuit, wherein the waste gas flow is transported to a heat exchanger (84) and warmed here relative to fresh air on the warm side of the heat exchanger (84), wherein the waste gas flow is led to an absorption filter (89) for removal of the last residues of solvent.

11. The method according to claim 4, wherein
the chopped material is entered into the swelling container (10) through a gas-sealed chamber sluice system (5, 6, 7, 8) or a gas-sealed cell wheel, which transfers the chopped material at a predeterminable flow speed into the swelling container (10) sealed against gas.

12. The method according to claim 1, wherein
the chopped material is fed as a defined volume flow sealed against air to the swelling container (10).

13. The method according to claim 1, wherein
an absolute continuous mass flow of swollen chopped cable pieces in a bulk density is generated by way of a conveyor (12), disposed at a lower end or in the lower end of the swelling container (10), wherein the mass flow of swollen chopped cable pieces is entered into the roller cone mill (13), whereby the absolute continuous mass flow of swollen chopped cable pieces contains in the bulk density only such amounts of liquid solvent as there is free space in a heap fill, and subsequently the absolute continuous mass flow of swollen chopped cable pieces is continuously flexed in the roller cone mill (13).

14. The method according to claim 1, wherein
a three-phase or multi-phase mixture passes repeatedly through the stage of the sedimentation, and wherein several sequentially disposed sedimentors for metal and/or plastic (16, 38) are employed, respectively.

15. The method according to claim 1, wherein
dichloromethane is employed as swelling agent or solvent.

16. An apparatus for a continuous recycling of plastic-coated cable residues and cable scrap, by mechanical comminution of the cable scraps, comprising
a swelling container (10) with swelling agent and solvent, respectively, for softening and stirring chopped material, stirrer devices,
impacting devices, and grinding devices, respectively, for separating/splitting a swollen plastic/metal compound by way of mechanical means, a gravity separator/sieve for separating a suspension including solvent/plastic/metal by gravity separation/sieving,
a roller cone mill (13), disposed following to the swelling container (10),
a following mechanical double arm stirrer (14) for a mechanical separation of metal particles from residual jacketings,
a following metal sedimentor (16) for separating metal particles, which are heavier as compared to plastic particles and possible dirt particles based on gravity, and wherein the metal particles are removable from the metal sedimentor (16) at a lower end of the metal sedimentor (16),
a countercurrent of the swelling agent and/or solvent entered into the metal sedimentor (16) for removal of light plastic particles and dirt particles from a transport flow and the metal particles sinking in the transport flow,
a following plastic sedimentor (38), wherein the countercurrent together with the plastic particles and dirt particles from the metal sedimentor (16) are entered as a metal-free part flow into the plastic sedimentor (38) for a sediment-type depositing and separation of the plastic particles,
wherein all parts of the apparatus are sealed against gas relative to the environment.

17. The apparatus according to claim 16, further comprising
a gas-sealed chamber sluice system, including sliders (5, 7, 9) and at least two chamber sluices (4, 6, 8) or a cell wheel with sluice container, disposed in front of the swelling container (10) for a defined, gas-sealed transfer of volume of the chopped material into the swelling container (10).

18. The apparatus according to claim 17, further comprising
a transport worm (12);
wherein the swelling container (10) is formed conically at its lower end, and wherein the transport worm (12) is connected to this lower end.

19. The apparatus according to claim 16, further comprising
a casing (107) provided for the roller cone mill (13),
a flexing cone (91) disposed rotatable around an axle of the flexing cone,
a motor driving said axle,
a linking connector (92) placed onto the flexing cone (91), wherein the linking connector (92) is spring-loaded with springs (108) and is pressed onto the flexing cone (91), such that a tip of the flexing cone (91) protrudes into the linking connector (92).

20. The apparatus according to claim 19, further comprising
a ring having an outer circumferential jacket wall (109) and disposed at the linking connector (92) which ring is supported movably up and down with its outer circumferential jacket wall (109) within the casing (107) of the roller cone mill (13),
an inner circumferential jacket surface (110) of the linking connector (92) curved in convex shape and forming with the cone-shaped surface of the flexing cone (91) an outwardly narrowing circumferential slot 11.

21. The apparatus according to claim 16, further comprising
a bypass line (11) with an automatic flow-through control connected to the swelling container (10) at a position below the liquid level (15) of the swelling container (10), wherein the bypass line (11) leads at least to the double arm stirrer (14) for an automatically controlled liquid supply of the double arm stirrer (14) with swelling liquid.

22. The apparatus according to claim 16, wherein the double arm stirrer (14) comprises
a cylindrical container (113) with upper inlets (114, 116) and a lower discharge port (124) having a spiral-shaped end, bent, fixed stator arms (94) and an axle (115) rotatably disposed aligned in longitudinal direction of the cylindrical container (113), bent rotor arms (93) attached at an axle (115), wherein the rotor arms (93) are capable of passing inbetween the stator arms (94) in case of a rotation of the axle (115), whereby a rotation energy of a three-phase mixture is used through the discharge port (124) such that the double arm stirrer (14) operates simultaneously as a pump.

23. The apparatus according to claim 16, wherein the plastic sedimentor (38) comprises
a cylindrical central container (100) having a top and a bottom;
a collection funnel (102) disposed at the top of the central container (100),
a funnel-shaped floor (101) with a discharge pipe (125) disposed at the bottom of the central container (100),
a feed tube (99) joining into the central container (100) tangentially horizontally at a lower end of the central container (100) above a funnel-shaped floor (101),
a horizontal discharge port (103) for sedimented-off solvent disposed in an upper region of the central container (100) and tangentially disposed relative to the central container (100).

24. The apparatus according to claim 23, further comprising
a parallel-flow filter (39) placed on the central container (100),
a pipe line (52), connected laterally relative to the parallel-flow filter (39) and to the parallel-flow-filter, wherein a volume of solvent of a plant is automatically controlledly withdrawn through the parallel-flow filter (39) and the pipe line (52), and wherein the volume of solvent withdrawn is necessary in order to maintain an effectiveness of the solvent.

25. The apparatus according to claim 24, further comprising
a second parallel-flow filter (40) disposed above the first parallel-flow filter (39),
an overflow container (45),
a lateral pipe line (119) disposed at the second parallel-flow filter (40) and running to the overflow container (45),
a condensed-water container,
a siphon line (120) connected to the overflow container (45), wherein the siphon line (120) leads into the condensed-water container (55), wherein the second parallel-flow filter (40) is positioned relative to the liquid level (15) of the plant such that water with a smaller density than that of the solvent floats on the solvent.

26. The apparatus according to claim 25, further comprising
a drying system (47),
a transport worm (41) connected to the second parallel-flow filter (39), wherein a phase boundary between the water and the solvent penetrates into the transport worm (41) for discharge transport of the solid particles reaching the transport worm (41) through the liquid level (15) of the plant into the drying system (47),
a container (54) for waste is connected, separated through a chamber sluice system (48, 49, 50, 51), to the drying system (47).

27. The apparatus according to claim 16, further comprising
a predeterminable countercurrent of swelling agent and/or solvent is generatable within the metal sedimentor (16) for a floating of lighter plastic particles and dirt particles, wherein the countercurrent is leadable out of the metal sedimentor (16) from a main flow as a part flow through a further outlet port,
a metal collection container (17) for collecting the metal particles and disposed below the metal sedimentor (16),
a conveyor (22) provided as a transport worm (22) follows to the metal collection container (17), wherein the transport worm (22) lifts the metal particles above the liquid level of the plant and transports the metal particles for drying purposes into a drying system (27) for then following charge of the metal particles into a metal collection container (33).

28. A method for a continuous recycling of plastic-coated cable residues and cable scrap comprising
mechanically comminuting cable residues;
softening chopped material in a swelling container with a swelling agent and/or solvent;
feeding the swollen chopped material to at least one roller cone mill;

braking plastic jackets open in the roller cone mill;

loosening wire cores in the roller cone mill without inducing a grinding of the components;

separating and splitting up the swollen plastic/metal compound by way of a double arm stirrer including one of stirring, impacting, and grinding;

separating the suspension containing solvent, plastic and metal by one of gravity deposition and sieving, wherein heavier metal particles sink down in a metal sedimentor based on gravity and separate themselves from lighter plastic particles and possible dirt particles;

withdrawing the metal particles from the metal sedimentor at the lower end of the metal sedimentor;

selecting a transport speed of a transport flow of a three or multi-phase mixture within the metal sedimentor such that the metal particles, according to their size-dependent different sinking speeds, sink down up to the exit from the metal sedimentor or, respectively, up to the lower end of the metal sedimentor;

entering a predeterminable countercurrent of swelling agent and/or solvent into the transport flow;

flushing the lighter plastic particles and dirt particles with the countercurrent from the transport flow while the metal particles are sinking down in the transport flow;

leading the countercurrent together with the plastic particles and the dirt particles out of the metal sedimentor as a metal-free part current;

leading the countercurrent together with the plastic particles and the dirt particles into a plastic sedimentor for a sediment-like extracting and separation of the plastic particles;

drying in a closed system for recovery of the solvent;

performing all steps gas sealed relative to the environment.

29. The method according to claim 28 further comprising circulating the swelling agent in a closed circuit;

sucking the swelling agent off from the stations of the metal purification and plastic purification and/or the metal drying and plastic drying;

separating the swelling agent in a separating station in a cleaning process; and subsequently leading the swelling agent again into the swelling container.

30. The method according to claim 28 further comprising generating an absolute continuous mass flow of swollen chopped cable pieces in a bulk density by way of a conveyor furnished as a transport worm, wherein the transport worm is disposed at a lower end of the swelling container;

entering a mass flow of swollen chopped cable pieces into the roller cone mill, whereby the swollen mixture contains in the bulk density only such amounts of solvent as there is free space in the heap fill; and subsequently continuously flexing the material in the roller cone mill.

31. The method according to claim 29 further comprising transporting the metal particles behind the metal sedimentor into a metal collection container;

lifting the metal particles with a transport worm above a liquid surface level of the plant from the metal collection container;

subsequently drying the metal particles in a drying system;

discharging the metal particles through a discharge chamber system into a metal container.

32. The method according to claim 31 further comprising transporting dripping-wet plastic and polyvinylchloride PVC particles from a plastic sedimentor through the liquid level of a plant;

sieving the dripping-wet plastic and polyvinylchloride PVC particles from the excess solvent with a transport worm;

subsequently finely grinding the particles with a plastic defibrator; and subsequently drying the particles.

33. The method according to claim 32 further comprising entering the chopped material into the swelling container through a gas-sealed chamber sluice system, which transfers the chopped material at a predeterminable flow speed into the swelling container sealed against gas.

34. The method according to claim 32 further comprising entering the chopped material into the swelling container through a gas-sealed cell wheel, which transfers the chopped material at a predeterminable flow speed into the swelling container sealed against gas.

35. The method according to claim 32 further comprising evaporating a volume of solvent together with impurities for recycling in a jacket-heated dry transport worm;

passing softener, sliding agent, and other materials into the solvent;

polymerizing softener, sliding agent, and other materials out as a flocky layer;

grinding these polymer flakes together with the polyvinylchloride PVC particles, which can still be wet from swelling;

solvating the polymer flakes again on the surface of the polyvinylchloride PVC particles;

returning the polymer flakes into the polyvinylchloride PVC, whereby a quality of polyvinylchloride PVC recycled material to be recovered is obtained according to the qualities of original polyvinylchloride.

36. The method according to claim 35 further comprising leading the countercurrent within the metal sedimentor as a part flow out of the metal sedimentor into the plastic sedimentor;

floating suspended materials, softener oils, and floating impurities as a layer in the plastic sedimentor; and separating suspended materials, softener oils, and floating impurities from the plastic particles;

leading the impure layer in a partial volume flow out of the plastic sedimentor; and lifting the impure layer above the liquid level of the plant; and guiding the impure layer into a heatable transport worm;

drying the impure layer in the heatable transport worm.

37. The method according to claim 35 further comprising tangentially entering the mass flow led into the plastic sedimentor at the lower end of the plastic sedimentor such that the liquid within the plastic sedimentor rotates and generates a secondary flow;

depositing the largest part of the plastic particles, with a density larger than that of the solvent, at the floor of the plastic sedimentor; and discharging the largest part of the plastic particles with the flow through a discharge pipe of the floor below the flow-in opening;

transporting the largest part of the plastic particles in a conveyor;

lifting the elastic particles above the liquid level of the plant with the conveyor; and feeding the swollen-wet plastic particles to a plastic defibrator;

collecting a member of the group consisting of contamination, water droplets, paper shreds, textile fibers, and polyolefins, having densities smaller than that of the solvent, in the upper tip of the plastic sedimentor;

leading the contamination by way of a transport worm from the plastic sedimentor;

subsequently drying the contamination in the dryer; and transporting the contamination to the outside through the chamber sluice system.

38. The method according to claim 35 further comprising transporting solvent vapor through a line into a heat exchanger with a vacuum pump for recovery of the solvent from the desorption container;

employing environmental thermal capacity on the cold side at temperatures on the cold side of below 303 degrees Kelvin in the heat exchanger; and condensing thereby the largest part of the solvent out of the solvent vapor;

subsequently flowing the liquid solvent back through lines to a pump into the circuit by way of gravity;

admixing a waste gas flow behind the heat exchanger to a waste gas flow of the desorption container within a line.

39. The method according to claim 38 further comprising pressing the waste gas into a heat exchanger to assure a low-temperature cooling of the waste gas;

condensing the largest part of the still present solvent vapor out of the waste gas; and returning the largest part of the still present solvent vapor through a line to the cycle;

transporting the waste gas flow to a heat exchanger;

warming the waste gas flow in the heat exchanger relative to fresh air on the warm side of the heat exchanger;

leading the waste gas flow to an absorption filter for removal of the last residues of solvent.

40. The method according to claim 31 further comprising separating a dried, however still with absorbed solvent coated, polyvinylchloride PVC granulate in a chamber by way of a chamber sluice system;

transporting the dried, however still with absorbed solvent coated, polyvinylchloride PVC granulate into a desorption container;

supplying the desorption container with dehumidified fresh air for desorption;

removing the desorbed polyvinylchloride PVC granulate from the desorption container.

41. The method according to claim 28 further comprising feeding the chopped material as a defined volume flow and sealed against air to the swelling container.

42. The method according to claim 28 further comprising repeatedly passing the three-phase or multi-phase mixture through the stage of the sedimentation.

43. The method according to claim 28 further comprising employing several sequentially disposed sedimentors for metal and/or plastic.

44. The method according to claim 28 further comprising employing dichloromethane as swelling agent or solvent; and stirring the chopped material in the swelling container.

45. An apparatus for a continuous recycling of plastic-coated cable residues and cable scrap comprising comminuting means for mechanical comminution of cable scraps;

a swelling container with swelling agent and/or solvent for softening and stirring chopped and comminuted material, including stirrer devices, impacting devices, and grinding devices, respectively, for separating/splitting of swollen plastic/metal compound by way of mechanical means and including a gravity separator/sieve for separating a suspension comprising solvent/plastic/metal by gravity separation/sieving;

a roller cone mill disposed following to the swelling container and connected to the swelling container;

a mechanical double arm stirrer following to the roller cone mill for a mechanical separation of metal particles from residual jacketings, a metal sedimentor following to the mechanical double arm stirrer for a separation based on gravity of metal particles as compared to plastic particles and possible dirt particles;

a discharge sort disposed at a lower end of the metal sedimentor for removal of the metal particles from the metal sedimentor;

a feed port disposed at the metal sedimentor for feeding a countercurrent of swelling agent and/or solvent into the metal sedimentor for removal of the plastic particles and dirt particles from a transport flow and the metal particles sinking in the transport flow;

a plastic sedimentor following to the metal sedimentor for receiving a countercurrent together with the plastic particles and dirt particles from the metal sedimentor as a metal-free part flow into the plastic sedimentor for a sediment-type depositing and separation of the plastic particles;

wherein all parts of the apparatus are sealed against gas relative to the environment.

46. The apparatus according to claim 45 further comprising a gas-sealed chamber sluice system, including sliders and at least two chamber sluices and a cell wheel, respectively, with sluice container, is disposed in front of the swelling container for a defined, gas-sealed transfer of volume of chopped material into the swelling container.

47. The apparatus according to claim 46, wherein the swelling container is formed conically at its lower end and further comprising a transport worm is connected to this lower end.

48. The apparatus according to claim 45, wherein the roller cone mill comprises a casing, a flexing cone disposed rotatable around an axle, a motor driving the axle, a linking connector placed onto the flexing cone, springs for spring-loading the linking connector and for pressing the linking connector onto the flexing cone, such that a tip of the flexing cone protrudes into the linking connector.

49. The apparatus according to claim 48, wherein the linking connector comprises a ring, which ring is supported movably up and down with its outer circumferential jacket wall within the casing of the roller cone mill, wherein an inner circumferential jacket surface of the linking connector is curved in convex shape and forms a circumferential slot with a cone-shaped surface of the flexing cone, with said circumferential slot narrowing outwardly.

50. The apparatus according to claim 45 further comprising a bypass line with an automatic flow-through control and connected to the swelling container at a position below a liquid level of the swelling container, wherein the bypass line leads at least to the mechanical double arm stirrer for an automatically controlled liquid supply of the double arm stirrer with swelling liquid.

51. The apparatus according to claim 45, wherein the mechanical double arm stirrer comprises a cylindrical container with upper inlets, and a lower discharge port ending like a spiral, and bent, fixed stator arms, an axle, wherein the bent, fixed stator arms and the axle are rotatably disposed aligned in longitudinal direction of the cylindrical container, bent rotor arms attached at the axle, wherein the rotor arms are constructed to pass inbetween the bent, fixed stator arms in case of a rotation of the axle, whereby a rotation energy of a three-phase mixture is used through the discharge port such that the double arm stirrer operates simultaneously as a pump.

52. The apparatus according to claim 45, wherein the plastic sedimentor comprises a cylindrical central container, which exhibits a collection funnel in an upper region and which exhibits a funnel-shaped floor with a discharge pipe at a lower end, wherein a feed tube joins into the cylindrical central container tangentially horizontally at the lower end of the cylindrical central container above the funnel-shaped floor, and wherein a horizontal discharge port for sedimented-off solvent is disposed in the upper region of the cylindrical central container and tangentially disposed relative to the cylindrical central container.

53. The apparatus according to claim 52 further comprising a parallel-flow filter placed on the cylindrical central container, wherein a volume of solvent of the plant is automatically controlledly withdrawn through the parallel-flow filter and a pipe line, and wherein the volume of solvent withdrawn is necessary in order to maintain an effectiveness of the solvent.

54. The apparatus according to claim 53, wherein a second parallel-flow filter is disposed above the first parallel-flow filter, wherein the second parallel-flow filter exhibits a lateral pipe line, which runs to an overflow container, and wherein a siphon line is connected to the overflow container, wherein the siphon line leads into a condensed-water container, wherein the second parallel-flow filter is positioned relative to the liquid level of the plant such that water with a smaller density than that of the solvent floats on the solvent.

55. The apparatus according to claim 54 further comprising a transport worm connected to the second parallel-flow filter, wherein a phase boundary between the water and solvent penetrates into the transport worm for discharge transport of the solid particles reaching the transport worm through the liquid level of the plant into a drying system, wherein a container for the waste is connected, separated through a chamber sluice system, to the drying system.

56. The apparatus according to claim 45, wherein a predeterminable countercurrent of swelling agent and/or solvent is generatable within the metal sedimentor for floating plastic particles and possible dirt particles, wherein the countercurrent is leadable out of the metal sedimentor from the main flow as a part flow through a further outlet port;

further comprising a metal collection container for collecting the metal particles disposed below the metal sedimentor; and a conveyor furnished as a transport worm follows to the metal collection container, wherein the transport worm lifts the metal particles above the liquid level of the plant and transports the metal particles;

a drying system for receiving the transported metal particles for drying purposes;

a metal collection container following to the drying system for receiving the metal particles discharged by the drying system.

* * * * *